United States Patent [19]

Mori et al.

[11] Patent Number: 5,037,885

[45] Date of Patent: Aug. 6, 1991

[54] TWO PART PRIMER COMPOSITION OF ANHYDRIDE-MODIFIED SEBS OR SEPS BLOCK COPOLYMER AND EPOXY RESIN

[75] Inventors: Masahito Mori; Kohske Torii, both of Takatsuki; Hirokazu Okamoto, Shijonawate, all of Japan

[73] Assignee: Sunstar Giken Kabushiki Kaisha, Osaka, Japan

[21] Appl. No.: 442,739

[22] Filed: Nov. 28, 1989

[30] Foreign Application Priority Data

Nov. 29, 1988 [JP] Japan ................................. 63-303227

[51] Int. Cl.$^5$ ........................ C08L 51/06; C08L 53/00
[52] U.S. Cl. .................................... 525/92; 523/436; 525/65
[58] Field of Search ........................... 525/65, 92, 436

[56] References Cited

U.S. PATENT DOCUMENTS

| 4,481,323 | 11/1984 | Sterling | 525/92 |
| 4,529,755 | 7/1985 | Mishikawa et al. | 525/92 |
| 4,578,429 | 3/1986 | Gergen et al. | 525/291 |
| 4,609,697 | 9/1986 | Albers | 525/92 |
| 4,628,072 | 12/1986 | Shiraki et al. | 525/92 |

FOREIGN PATENT DOCUMENTS

| 0308179 | 3/1989 | European Pat. Off. | 525/92 |
| 58-40350 | 3/1983 | Japan | 525/92 |

Primary Examiner—John C. Bleutge
Assistant Examiner—Robert E. L. Sellers, II
Attorney, Agent, or Firm—Wegner, Cantor, Mueller & Player

[57] ABSTRACT

A two part primer composition comprising a main component comprising at least one styrene-ethylene-butene-styrene block copolymer or styrene-ethylene-propylene-styrene copolymer, said copolymer being copolymerized with maleic anhydride hydrogenated, and an amine catalyst, and a curing component comprising an epoxy resin having two or more functional groups, which has excellent heat-resistant adhesion and durable adhesion and is suitable for adhering between polyolefinic substances or between an polyolefinic substance and other organic substance.

4 Claims, No Drawings

TWO PART PRIMER COMPOSITION OF ANHYDRIDE-MODIFIED SEBS OR SEPS BLOCK COPOLYMER AND EPOXY RESIN

This invention relates to a two part primer composition, more particularly, to a two part primer composition comprising a main component comprising at least one styrene-ethylene-butene-styrene block copolymer or styrene-ethylene-propylene-styrene copolymer, said copolymer being copolymerized with maleic anhydride, and an amine catalyst, and a curing component comprising an epoxy resin having two or more functional groups, which has excellent heatresistant adhesion and durable adhesion and is suitable for adhering between polyolefinic substances or between polyolefinic substance and another organic substance.

PRIOR ART

There are recently increased demands for adhering between low polar polyolefinic substances (e.g. polypropylene (PP) plates, polyethylene (PE) plates, polyethylene (PE) foams, polypropylene (PP) foams, ethylene-propylene-diene terpolymer (EPDM) rubbers, ethylene-propylene rubbers (EPR), etc.), or between the polyolefinic substances and other organic substances (e.g. polyvinyl chloride (PVC) sheets, styrene-ethylene-butene-styrene copolymer (SEBS) plates, styrene-ethylene-propylene-styrene copolymer (SEPS) plates, polyvinyl chloride (PVC) foams, styrene-isoprene-styrene (SIS) rubbers, styrene-butadiene-styrene (SBS) rubbers, etc.). In such a case, the substances have previously been treated with a primer in order to exhibit sufficient adhesion between the substances by an adhesive. As these primers for polyolefins, there have been used a solution of a base material (e.g. chlorinated polyolefin) in an organic solvent, or a two part primer comprising a main component comprising a specific polyester resin and a curing component comprising a polyisocyanate. However, the chlorinated polyolefins to be used in such primers are not crosslinkable, and hence, the primers are inferior in the heat-resistant adhesion and durable adhesion. Besides, the two part primer comprising a polyester resin and a polyisocyanate is inferior in adhesion to the polyolefinic substances.

BRIEF DESCRIPTION OF THE INVENTION

The present inventors have intensively studied as to an improved primer suitable for polyolefins having no drawbacks as in the conventional primers as mentioned above, and with aiming at a styrene-ethylene-butene-styrene block copolymer (SEBS) or styrene-ethylene-propylene-styrene block copolymer (SEPS) which are copolymerized with maleic anhydride, and they have tried to use it as a material for adhering polyolefins. As a result, they have found that when the maleic anhydride-copolymerized SEBS or SEPS and an amine catalyst are used as the main component and an epoxy resin having two or more functional groups is used as the curing component, the two part primer can show excellent heat-resistant adhesion and durable adhesion and is suitable for adhering polyolefinic substances.

An object of the invention is to provide an improved two part primer suitable for adhering polyolefins. Another object of the invention is to provide a two part primer comprising a main component comprising at least one of a maleic anhydride-copolymerized SEBS or SEPS and an amine catalyst, and a curing component comprising an epoxy resin having two or more functional groups which has excellent heat-resistant adhesion and durable adhesion and is suitable for adhering between polyolefinic substances or between polyolefinic substances and other organic substances. These and other objects and advantages of the invention will be apparent to those skilled in the art from the following description.

DETAILED DESCRIPTION OF THE INVENTION

The two part primer composition of this invention comprises a main component comprising a maleic anhydridecopolymerized SEBS or SEPS and an amine catalyst, and a curing component comprising an epoxy resin having two or more functional group.

The maleic anhydride-copolymerized SEBS or SEPS used in this invention are known and are usually used as a hot-melt type resin. The maleic anhydride is preferably copolymerized in an amount of 1 to 10% by weight.

The amine catalyst includes, for example, imidazole compounds (e.g. imidazole, 2-n-heptadecylimidazole, etc.), tertiary amines [e.g. tris(dimethylaminomethyl)-phenol, dimethylbenzamide, 1,8-diazobicyclo[5.4.0]undecane, etc.), or their salts [e.g. 1,8-diazobicyclo[5.4.0]undecane phenol salt, 1,8-diazobicyclo[5.4.0]undecane 2-ethylhexanoate, 1,8-diazobicyclo[5.4.0]undecane oleate, etc.), and the like, which are used alone or in combination of two, or more thereof. These amine catalysts function by promoting the curing of the composition with the curing component and are usually used in an amount of 10 to 100 parts by weight to 100 parts by weight of the curing component.

The epoxy resin having two or more functional groups used as a curing component in this invention includes glycidyl ether type epoxy resins which have two or more functional groups, for example, a reaction product of a polyhyric phenol with epichlorohydrin (e.g. diglycidyl ether of 2,2-bis(4-hydroxyphenyl)propane (hereinafter, referred to as "bisphenol A"), etc.), a reaction product of a polyhydric phenol alkylene oxide adduct with epichlorohydrin (e.g. diglycidyl ether of bisphenol A ethylene oxide or of a mixture of bisphenol A ethylene oxide and bisphenol A propylene oxide, etc.), a reaction product of an aliphatic polyhydric alcohol with epichlorohydrin (e.g. glycerin triglycidyl ether, 1,6-hexanediol diglycidyl ether, etc.), a hydrogenated reaction product of a polyhydric phenol or its alkylene oxide adduct with epichlorohydrin (e.g. polyglycidyl ether of hydrogenated bisphenol A, etc.), and the like. Preferred epoxy resin is the polyhydric phenol derivative, i.e. diglycidyl ether of bisphenol A. The epoxy resins have preferably an epoxy equivalent of not more than 500 and are preferably liquid at room temperature.

The epoxy resin is usually used in an amount of 1 to 20 parts by weight, preferably 3 to 10 parts by weight, to 100 parts by weight of the maleic anhydride-copolymerized SEBS or SEPS resin in the main component. When the amount of the epoxy resin is less than 1 part by weight, the primer obtained therefrom does not show sufficient heat-resistant adhesion and durable adhesion. On the other hand, when the amount of epoxy resin is over 20 parts by weight, the primer tends to show decreased adhesion.

The two part primer composition of this invention comprises the above maleic anhydride-copolymerized SEBS or SEPS resin and an amine catalyst in admixture with an appropriate organic solvent, such as aromatic hydrocarbons (e.g. toluene, benzene, xylene, etc.), ketones (e.g. methyl ethyl ketone, acetone, etc.), esters (e.g. ethyl acetate, butyl acetate, etc.), ethers (e.g. diethyl ether, tetrahydrofuran, dioxane, etc.), and an epoxy resin having two or more functional groups (as the curing component). The two part primer composition may optionally be incorporated with an appropriate amount of the conventional film-forming resins or rubbers, dehydrating agents, plasticizers, and the like in the main component.

The two part primer composition of this invention can be applied for adhering various polyolefinic substances with various types of adhesives with excellent heatresistant adhesion and durable adhesion.

This invention is illustrated by the following Examples but should not be construed to be limited thereto.

EXAMPLES 1 to 6 AND REFERENCE EXAMPLES 1 to 5

(1) Preparation of primer compositions:

Various main resins and amine catalysts in an amount as shown in Table 1 are each dissolved in toluene to prepare the main components, and they are combined with the curing components to give the desired two part primer compositions.

TEST OF ADHESION STRENGTH

A polypropylene (PP) plate (IP-407, manufactured by Mitsui Petroleum Co., Ltd.) was applied with each primer composition as prepared in the above Examples and Reference Examples, and then dried at 100° C. for two minutes. Thereafter, a urethane adhesive (Penguin Cement #903, manufactured by Sunstar Giken K.K.) was applied onto the primer layer of the plate. Separately, a polyvinyl chloride (PVC) sheet (Orsia MP-053, manufactured by Sunstar Giken K.K.) was also applied with the same urethane adhesive as above and dried at room temperature for 5 minutes. The PVC sheet and the PP plate were laminated to each other with facing the adhesive layers thereof and pressed with a roller of 5 kg to give a test piece.

The test pieces thus prepared were subjected to test of adhesion strength under various conditions, wherein the peel strength was measured by peeling the test pieces at an angle of 180°. The results are shown in Table 1.

TABLE 1

| Components | Examples | | | | | | Reference Examples | | | | |
|---|---|---|---|---|---|---|---|---|---|---|---|
| | 1 | 2 | 3 | 4 | 5 | 6 | 1 | 2 | 3 | 4 | 5 |
| Main components: | | | | | | | | | | | |
| Maleic anhydride-copolymerized SEBS | | | | | | | | | | | |
| Tuftec M-1913 *1 | 100 | 100 | 100 | 100 | — | — | 100 | — | — | — | — |
| Tuftec M-1911 *2 | — | — | — | — | 100 | — | — | — | — | — | — |
| KRATON FG 1901X *3 | — | — | — | — | — | 100 | — | — | — | — | — |
| Chlorinated polypropylene | | | | | | | | | | | |
| Hardlen 15L *4 | — | — | — | — | — | — | — | 100 | — | — | — |
| Supercurone S-822 *5 | — | — | — | — | — | — | — | — | 100 | — | — |
| Polyester resin | | | | | | | | | | | |
| Elitel UE-3400 *6 | — | — | — | — | — | — | — | — | — | 100 | — |
| Elitel UE-4200 *7 | — | — | — | — | — | — | — | — | — | — | 100 |
| Toluene | 900 | 900 | 900 | 900 | 900 | 900 | 900 | 200 | 100 | 900 | 900 |
| Amine catalyst | | | | | | | | | | | |
| IBMI-12 *8 | 1 | — | — | — | — | — | — | — | — | — | — |
| K-54 *9 | — | 1 | — | — | — | — | — | — | — | — | — |
| DBU *10 | — | — | 1 | — | — | — | — | — | — | — | — |
| U-Cat CA-102 *11 | — | — | — | 1 | 1 | 1 | — | — | — | — | — |
| Curing components: | | | | | | | | | | | |
| Epikote 828 *12 | 5 | 5 | 5 | 5 | 5 | 5 | — | — | — | — | — |
| Desmodur R *13 | — | — | — | — | — | — | — | — | — | 50 | 50 |
| Adhesion strength: | | | | | | | | | | | |
| Initial peel strength (kg/in) *14 | 2.8 | 2.6 | 2.0 | 3.1 | 3.2 | 3.6 | 4.1 | 2.2 | 2.8 | 0.6 | 0.9 |
| Dry peel strength (kg/in) *15 | 6.2 | 5.9 | 5.8 | 6.3 | 5.5 | 5.4 | 3.8 | 2.8 | 2.6 | 0.1 | 0.2 |
| Heat-resistant creep (mm) *16 | 0 | 0 | 0 | 0 | 0 | 0 | More than 75 | More than 75 | More than 75 | More than 75 | More than 75 |
| Peel strength after aging with heating (kg/in) *17 | 5.8 | 5.6 | 4.9 | 5.3 | 5.6 | 5.2 | 3.5 | 0.1 | 0.1 | 0.1 | 0.1 |
| Peel strength after aging with heating under moisture (kg/in) *18 | 6.1 | 5.6 | 5.4 | 5.7 | 5.2 | 5.1 | 3.4 | 0.1 | 0.1 | 0.1 | 0.1 |

*1 SEBS having maleic anydride content of 3% by weight (manufactured by Asahi Chemical Industry Co., Ltd.)
*2 SEBS having maleic anydride content of 2% by weight (manufactured by Asahi Chemical Industry Co., Ltd.)
*3 SEBS having maleic anydride content of 2% by weight (manufactured by Shell Chemical K.K.)
*4 Manufactured by Toyo Kasei K.K.
*5 Manufactured by Sanyo Kokusaku Pulp K.K.
*6 Manufactured by UNITIKA Ltd.
*7 Manufactured by UNITIKA Ltd.
*8 Imidazole manufactured by Yuka Shell K.K.
*9 A tertiary amine, 2,4,6-tris(dimethylaminomethyl)-phenol (manufactured by ACI Japan Ltd.)
*10 A tertiary amine, 1,8-diazabicyclo[5.4.0]undecane (DBU) (manufactured by Sun Apollo K.K.)
*11 A neutralized salt of DBU in the above *10
*12 A bisphenol A type epoxy resin (manufactured by Yuka Shell K.K.)
*13 Triphenylmethane triisocyanate (in 20% methylene chloride solution) (manufactured by Bayer)
*14 Measured 10 minutes after lamination.
*15 Measured after the test piece was kept at 20° C. for 24 hours.
*16 The Test piece was kept at 20° C. for 24 hours and given with a stationary load of 100 g/25 mm at 100° C. for 24 hours, and then, the peeled length was measured.
*17 Measured after the test piece was kept at 20° C. for 24 hours and subjected to aging at 100° C. for 400 hours.
*18 Measured after the test piece was kept at 20° C. for 24 hours and subjected to aging at 50° C. under 95% relative humidity for 400 hours.

What is claimed is:

1. A two part primer composition which comprises a main component comprising at least one member of the group consisting of a styrene-ethylene-butene-styrene block copolymer and styrene-ethylene-propylene-styrene block copolymer, said copolymer being copolymerized with maleic anhydride, and an amine catalyst in admixture with an organic solvent, and a curing component comprising an epoxy resin having two or more functional groups.

2. The two part primer composition according to claim 1, wherein the copolymer is copolymerized with maleic anhydride in an amount of 1% to 10% by weight.

3. The two part primer composition according to claim 1, wherein the amine catalyst is incorporated in an amount of 10 to 100 parts by weight to 100 parts by weight of the curing component.

4. The two part primer composition according to claim 1, wherein the curing component is incorporated in an amount of 1 to 20 parts by weight to 100 parts by weight of the copolymer in the main component.

* * * * *